United States Patent [19]
Christie et al.

[11] Patent Number: 5,755,485
[45] Date of Patent: May 26, 1998

[54] ROOFTOP DRAG REDUCING DEVICE

[75] Inventors: Douglas A. Christie, Brownsville; Joseph Rafac, Rancho Viejo, both of Tex.; Douglas A. Laver, Burlington, Canada; Richard Garozzo; Miles Gathright, both of South Padre Island, Tex.; Fernando Cardenas, Brownsville, Tex.; Homer Hernandez, Brownsville, Tex.; Estrella Pineda, Brownsville, Tex.; Lonnie Moreland, Las Vegas, Nev.

[73] Assignee: Airshield Corporation, Brownsville, Tex.

[21] Appl. No.: 749,222

[22] Filed: Nov. 14, 1996

[51] Int. Cl.⁶ .......................................... B60J 1/00
[52] U.S. Cl. ........................... 296/180.1; 296/180.4
[58] Field of Search ...................... 296/180.1, 180.2, 296/180.3, 180.4, 180.5

[56] References Cited

U.S. PATENT DOCUMENTS 4,749,220  6/1988  Adams et al. ............... 296/180.3
4,784,424  11/1988  Wiley, Jr. .................. 296/180.2
4,919,472  4/1990  Wiley, Jr. .................. 296/180.2
5,174,626  12/1992  Wiley, Jr. et al. ............ 296/180.1
5,603,549  2/1997  Chen et al. ................. 296/180.2

*Primary Examiner*—Jesus D. Sotelo
*Attorney, Agent, or Firm*—Mark P. Stone

[57] ABSTRACT

A rooftop drag reducing device includes a lower base portion fixedly mounted to the roof of a truck for semi-trailers. An upper portion of the drag reducing device is selectively movable relative to the base portion between a fully extended operating position, and a fully retracted storage position. In the fully retracted position, the upper portion is received within the lower portion such that at least part of the top surface of the lower portion is above the top surface of the upper portion. The design in accordance with the present invention increases the overall stability of the drag reducing device in both the extended and retracted positions, provides enhanced protection for the upper portion in its retracted position fully received within the lower portion, provides greater clearance than is possible with known drag reduction devices, and increases the maximum elevation within the cab or sleeper compartment of the vehicle to which the drag reduction device is mounted.

22 Claims, 13 Drawing Sheets

ROOFTOP DRAG REDUCING DEVICE

BACKGROUND OF THE INVENTION

The present invention relates to rooftop drag reducing devices for land vehicles, particularly tractor-trailer trucks. The invention more specifically relates to adjustable drag reducing fairings mounted to the roofs of trucks (e.g., above the cabs or the sleeper compartments) which drive trailers to facilitate multi-shipments of trucks alone after the drag reducing fairings have been mounted to the truck roofs.

Rooftop drag reducing devices including fairings have come into widespread use on trucks, particularly on cabs pulling semi-trailers. The drag reducing devices direct air passing over the top of the truck such that the resistance of wind hitting the flat front vertical portion of the trailer being pulled by the cab is minimized. A significant advantage of the drag reduction is the corresponding reduction in fuel costs to the trucker—the less resistance encountered by the moving tractor-trailer truck, the less fuel the truck consumes to reach its destination.

U.S. Pat. Nos. 4,784,424, 4,919,472, and 5,174,626, each of which are owned by the Assignee of the present application, describe two-piece drag reduction devices mounted to the roof of a truck to which a trailer is removably mountable. The disclosures of the aforementioned patents are expressly incorporated by reference herein. Each of the drag reduction devices disclosed in the aforementioned patents generally includes a base or lower fairing portion fixedly mounted to the top of a truck (e.g., the roof of a cab, or the roof of a sleeper compartment), and a top fairing portion including means for selectively moving the top portion relative to the lower base portion. As more fully disclosed in the aforementioned patents, the top portion is generally movable between an extended operating position to provide drag reduction when the truck is pulling the trailer, and a retracted non-operational storage position when a plurality of trucks (without attached trailers) are being transported in unison, as for example in a delivery of trucks from a manufacturing facility to a sales facility. As generally discussed in the aforementioned patents, the adjustable drag reduction devices reduce the maximum elevation of the trucks during multi-shipments to enable a plurality of trucks to be shipped and transported in one operation by permitting towed or "piggyback" trucks to fit under bridges and other overhead highway structures. The advantages of this type of multi-truck shipment include 1). reduced costs in transporting a plurality of trucks from one location to another, and 2). enabling the drag reduction device to be installed on the truck (and painted together with the truck) at the manufacturing facility and not at the sales facility.

It is the primary object of the present invention to provide an improved adjustable drag reduction device mountable to the roof of a motor vehicle, and in particular a roof fairing mounted to the roof of the cab or sleeper compartment of a truck pulling a semi-trailer. In accordance with this objective, the preferred embodiment of the present invention provides an adjustable roof fairing in which a top portion is completely received within a base portion in a fully retracted storage position. The base portion of the fairing is designed at a maximum allowable height such that the stability of the fairing is increased in its extended operating position, and the retracted fairing position provides greater clearance to the towed trucks travelling under overhead highway structures. The new roof fairing also increases maximum elevation within the cab or sleeper compartment to which the fairing is mounted as a result of the upper fairing portion being received completely within the lower fairing portion in the retracted position of the fairing.

Other objects and advantages of the present invention will become apparent to those skilled in the art from the following description.

SUMMARY OF THE INVENTION

The improvement of the present invention comprises an adjustable drag reduction device or roof fairing of the type adapted to be mounted to the roof of a truck, and in particular to the roof of the cab or the roof of a sleeper compartment of a truck adapted to pull a semi-trailer. The drag reduction device includes a generally hollow lower base portion fixedly mounted to the roof of the truck, and an upper portion mounted to the base portion for selective movement relative to the base portion. The upper portion is movable between a fully extended operating position in which the top surface of the upper portion extends above the top surface of the lower portion for deflecting air from the roof of the truck over the semi-trailer being pulled by the truck to reduce drag or wind resistance on the overall moving vehicle. The upper portion of the drag reduction device is movable into a retracted position in which it is fully received within the generally hollow lower portion of the device such that the top surface of the lower fairing portion is above the top surface of the upper fairing portion. In this manner, the upper portion is enclosed within the base portion in the retracted position, and is thereby more fully protected from adverse environmental conditions during transportation of the truck to which the device is mounted. Additionally, the base portion of the device is formed with a greater height than the upper portion, thereby enhancing the overall stability of the drag reduction device both in its extended and retracted positions mounted to the truck. The increased height of the base portion and the correspondingly decreased height of the movable upper portion of the device results in a greater range of clearance of the truck under overhead highway structures when multi-shipments of trucks are being towed in unison with the drag reduction devices mounted to the tops thereof in their respective retracted positions. The increased range of clearance provided by the greater height of the base portion of the device (and the corresponding reduced height of the movable upper portion of the device) permits the truck to be designed with higher cabs or sleeper compartments than is otherwise possible with known roof fairing designs, thereby increasing the space available to the driver.

The present invention includes different means for pivotably or hingedly mounting the upper fairing section for movement relative to the lower fairing section. In each embodiment of the invention, the mounting means are designed so that when the upper fairing section is received in the lower fairing section in the fully retracted position of the fairing, no portion of the top surface of the upper section is elevated above any portion of the top surface of the lower section. In further embodiments of the invention, the mounting means are also designed so that the rear end of the upper fairing section does not extend rearwardly of the rear end of the lower fairing section when the fairing is in its retracted position. In this manner, the upper section is completely received within the lower section.

Means are provided for removably securing the upper portion relative to the base portion when the drag reduction device is in its extended operating position. Means are also provided for removably securing the upper portion received within the base portion when the drag reduction device is in its retracted storage position.

3

The upper and lower portions of the drag reduction device may be formed from any suitable material, as for example, fiberglass. The fairing sections may be manufactured by conventional processes, as for example injection molding.

In the retracted fairing position of the preferred embodiment of the invention, the upper fairing section is received in the lower fairing section such that no portion of the top surface of the upper section (or substantially no portion of the top surface of the upper section) extends above the top surface of the lower section. However, it is also within the scope of the present invention to provide a roof fairing, which, when in its retracted fairing position, the majority of the top surface of the upper fairing section does not extend above the top surface of the lower fairing section. It is further within the scope of the present invention to provide a roof fairing in which at least a portion of the top surface of the upper fairing section does not extend above the top surface of the lower fairing section when the fairing is in its lower retracted folded position.

4

DESCRIPTION OF THE BEST MODES FOR CARRYING OUT THE INVENTION

Figure 1:
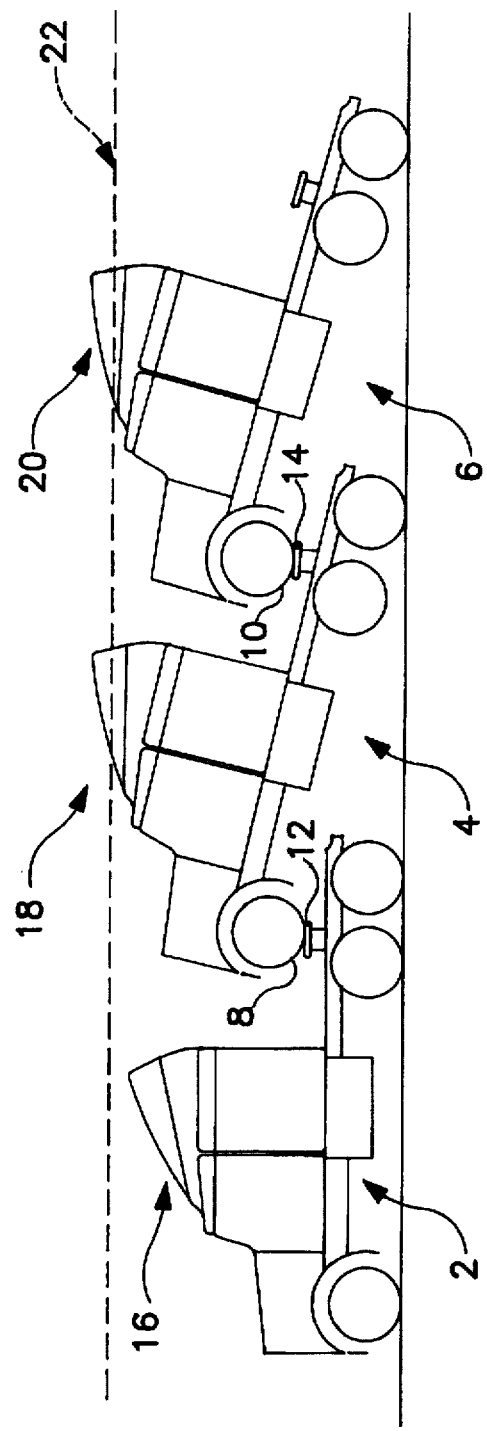
FIG. 1 represents the prior art and generally illustrates a plurality of trucks in towing relationship, each truck having a foldable roof fairing in its extended operating position mounted to the top thereof.

Referring first to FIGS. 1–2 and 4–5 of the drawing, known prior art roof fairings, such as those disclosed in U.S. Pat. Nos. 4,784,424 and 4,919,472, are generally illustrated. Reference numerals 2, 4 and 6 respectively designate first, second and third trucks for semi-trailers being shipped from a factory in a multiple towed shipment. The front wheel 8 of intermediate truck 4 is mounted to the fifth wheel 12 of the first truck 2, and the front wheel 10 of the last truck 6 is mounted to the fifth wheel 14 of the intermediate truck 4. Collapsible roof fairings 16, 18 and 20 are mounted atop the trucks 2, 4 and 6, respectively. In FIG. 1, each roof fairing is in its extended operating position, and the height of the fairings 18 and 20 on towed trucks 4 and 6 exceeds a predetermined height line designated by reference numeral 22.

Figure 2:
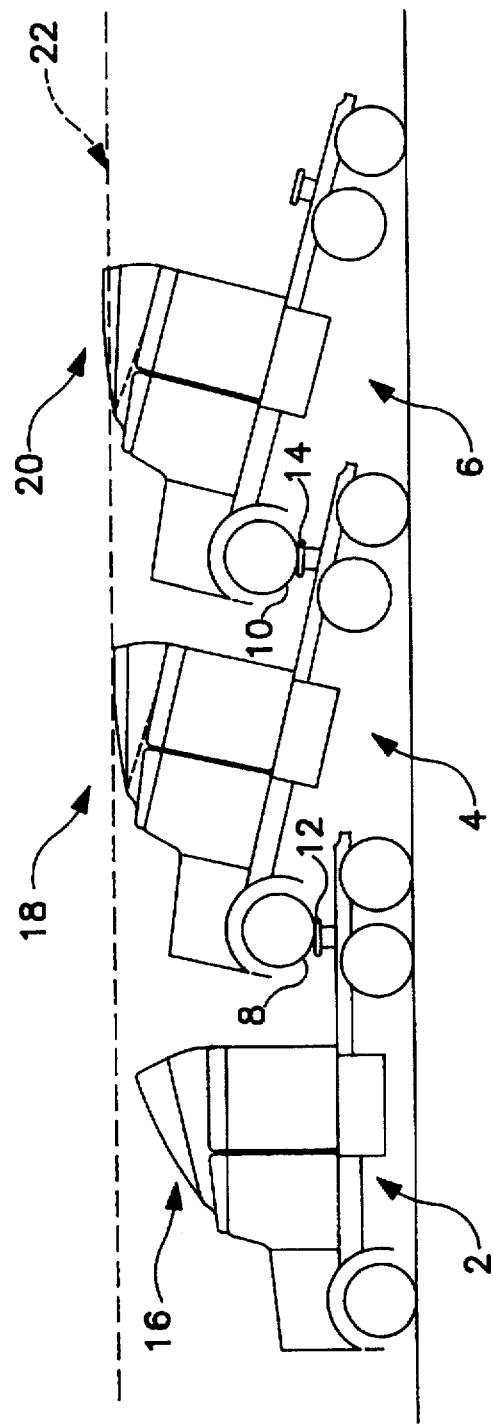
FIG. 2, also representing the prior art, is similar to FIG. 1 except that the roof fairings mounted to the last two trucks are shown in a folded storage position in which the top surface of the upper fairing portion is above the top surface of the lower fairing portion.

In FIG. 2 of the drawing, roof fairings 18 and 20 on the second and third towed trucks 4 and 6 are illustrated in a collapsed position in which a top fairing portion nonetheless extends above both a bottom fairing portion and the predetermined height line 22.

Figure 4:
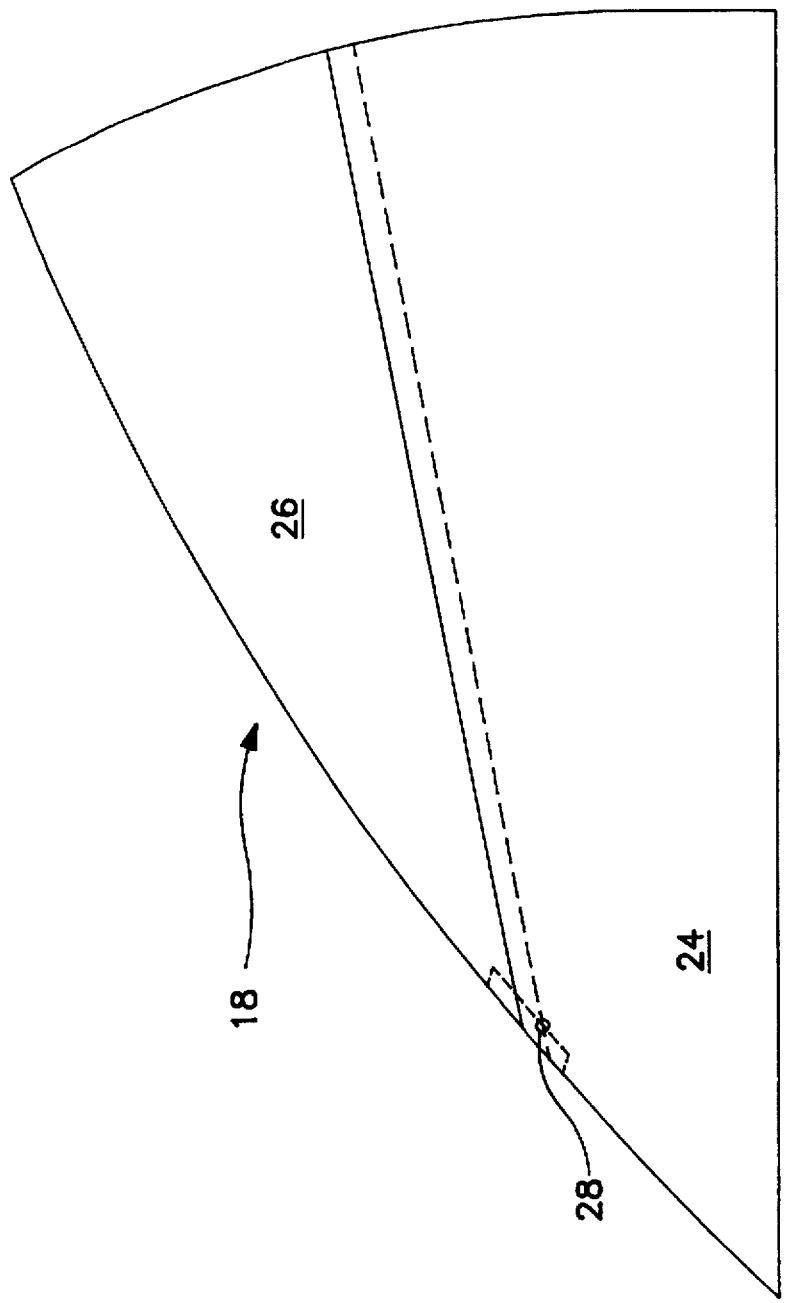
FIG. 4, representing the prior art, generally illustrates the roof fairing mounted to trucks illustrated in FIG. 1 removed from the trucks.

FIG. 4 of the drawing generally illustrates a collapsible roof fairing as shown in FIG. 1, as for example, fairing 18 in its extended operating position. The collapsible roof fairing 18 includes a bottom fairing section 24 and an upper fairing section 26 hingedly mounted together, as generally illustrated by reference numeral 28.

Figure 5:
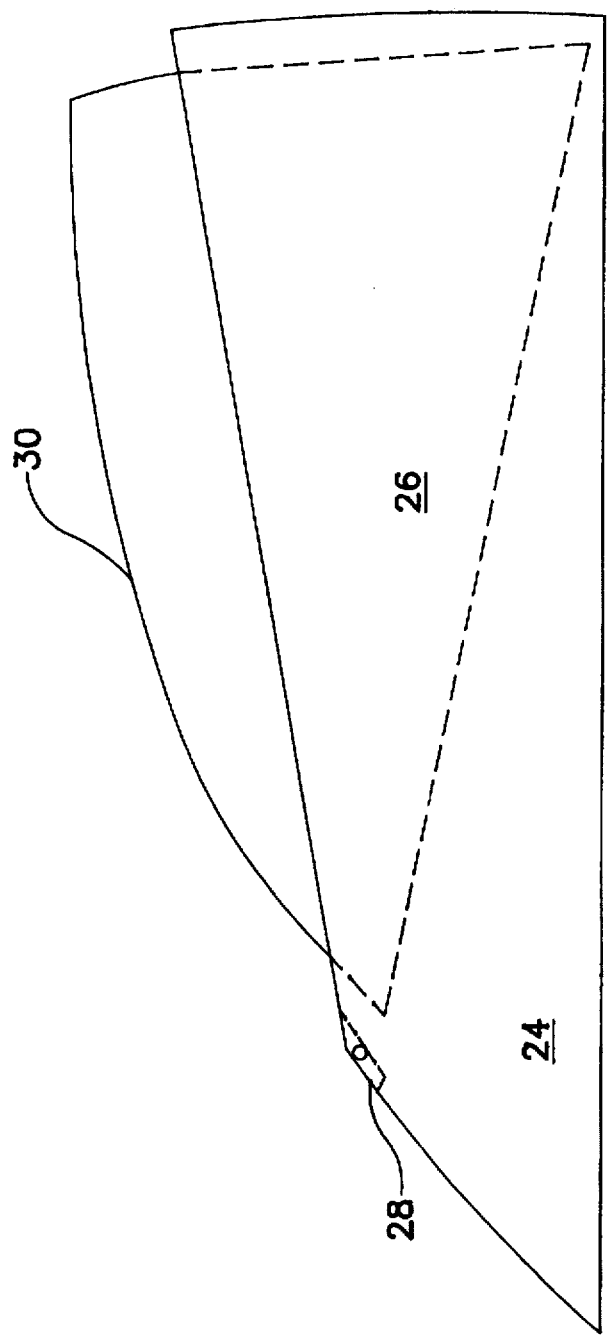
FIG. 5, representing the prior art, illustrates the roof fairing shown in FIG. 2 in a folded position in which the top surface of the upper fairing portion extends above the top surface of the lower fairing portion.

FIG. 5 illustrates roof fairing 18, as shown in FIG. 4 of the drawing, in its retracted position in which the top fairing section 26 is received within the lower fairing section 24. The top surface 30 of the upper fairing section 26 extends beyond the top surface of the lower fairing section 24 when the collapsible fairing is in its retracted position as illustrated by FIG. 5.

Figure 3:
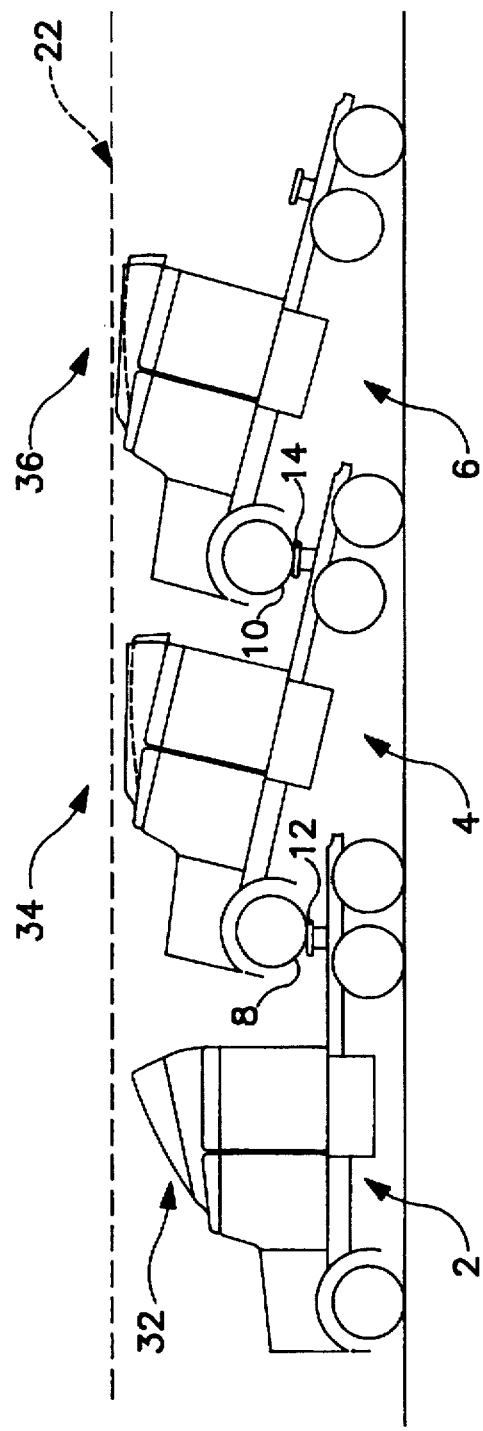
FIG. 3 generally illustrates the present invention in which the folded roof fairings mounted to the top of the last two trucks in tow are each shown in a folded position in which the top surface of the upper fairing portion does not extend above the top surface of the lower fairing portion.
Figure 6:
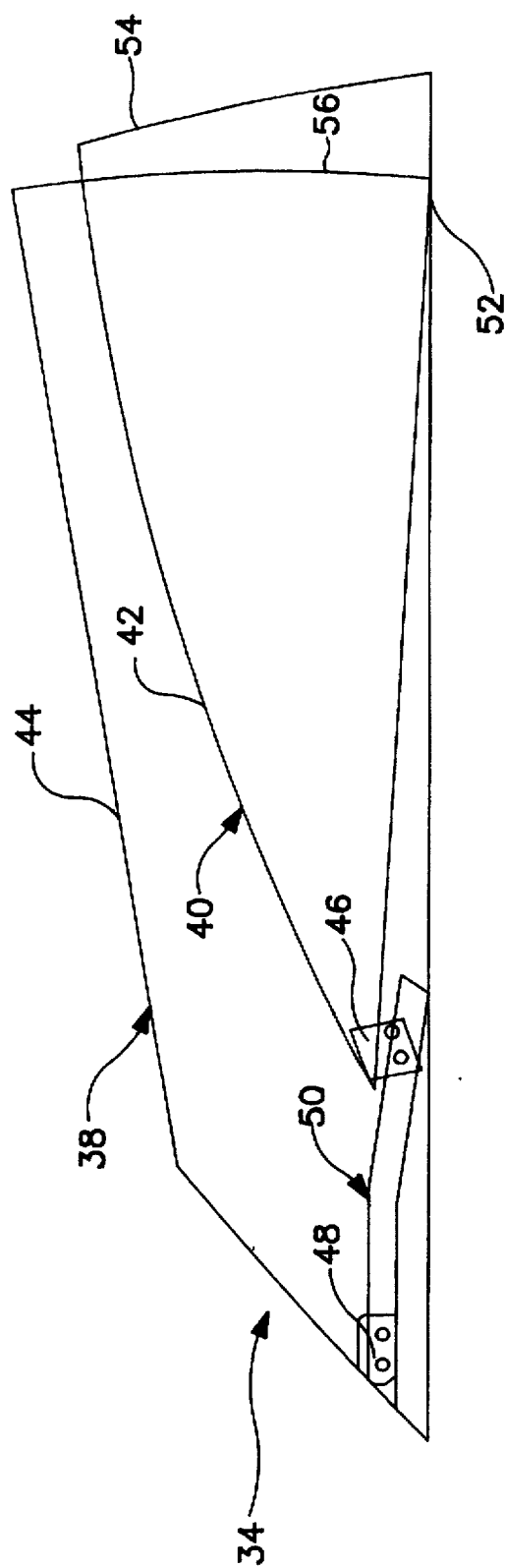
FIG. 6 generally illustrates the roof fairing mounted to the top of the trucks shown in FIG. 3 in which the upper fairing section is completely received folded into the lower fairing section, in accordance with the present invention.

FIG. 3 illustrates the trucks 2, 4, and 6 being transported in the same manner as illustrated in FIGS. 1 and 2. Each truck 2, 4 and 6 has a collapsible fairing 32, 34 and 36, in accordance with the present invention, respectively mounted to the top thereof. Fairing 32 on the lead truck 2 is shown in its extended operating position, while fairings 34 and 36 are shown in their retracted storage positions. The height of the towed trucks 4 and 6 with the retracted fairings 34 and 36 mounted atop thereof, does not extend above the predetermined height line 22. FIG. 6 generally illustrates one of the fairings shown in FIG. 3, as for example fairing 34, in its retracted folded position. Upper fairing segment 40 is received within hollow lower fairing segment 38 (which is fixedly mounted to the roof of truck 4 in FIG. 3) such that no portion of the top surface 42 of the upper fairing segment 40 extends beyond the top surface 44 of the lower fairing segment 38 when the fairing 34 is in its maximum retracted position as shown by FIG. 6. As will be discussed in greater detail below, the forward-portion of upper fairing segment 40 is hingedly mounted to the forward portion of lower fairing segment 38 by two pivotable elements 46 and 48 coupled to a movable arm 50. The rear portion of upper fairing segment 40 may be removably anchored to the rear portion of lower fairing segment 38 for removably retaining the fairing 34 in its retracted position by suitable anchoring means, as for example an anchoring bolt received through corresponding openings in the fairing segments, as generally illustrated by reference numeral 52. When the top segment 40 is received in the bottom segment 38 in the maximum retracted position as illustrated by FIG. 6, the rear end 54 of the upper fairing segment extends rearwardly beyond the rear end 56 of the lower fairing segment 38. The lower fairing section 38 is hollow to receive the upper fairing section 40, and preferably both the upper and lower fairing sections are formed from fiberglass and are fabricated by conventional molding processes.

Figure 7:
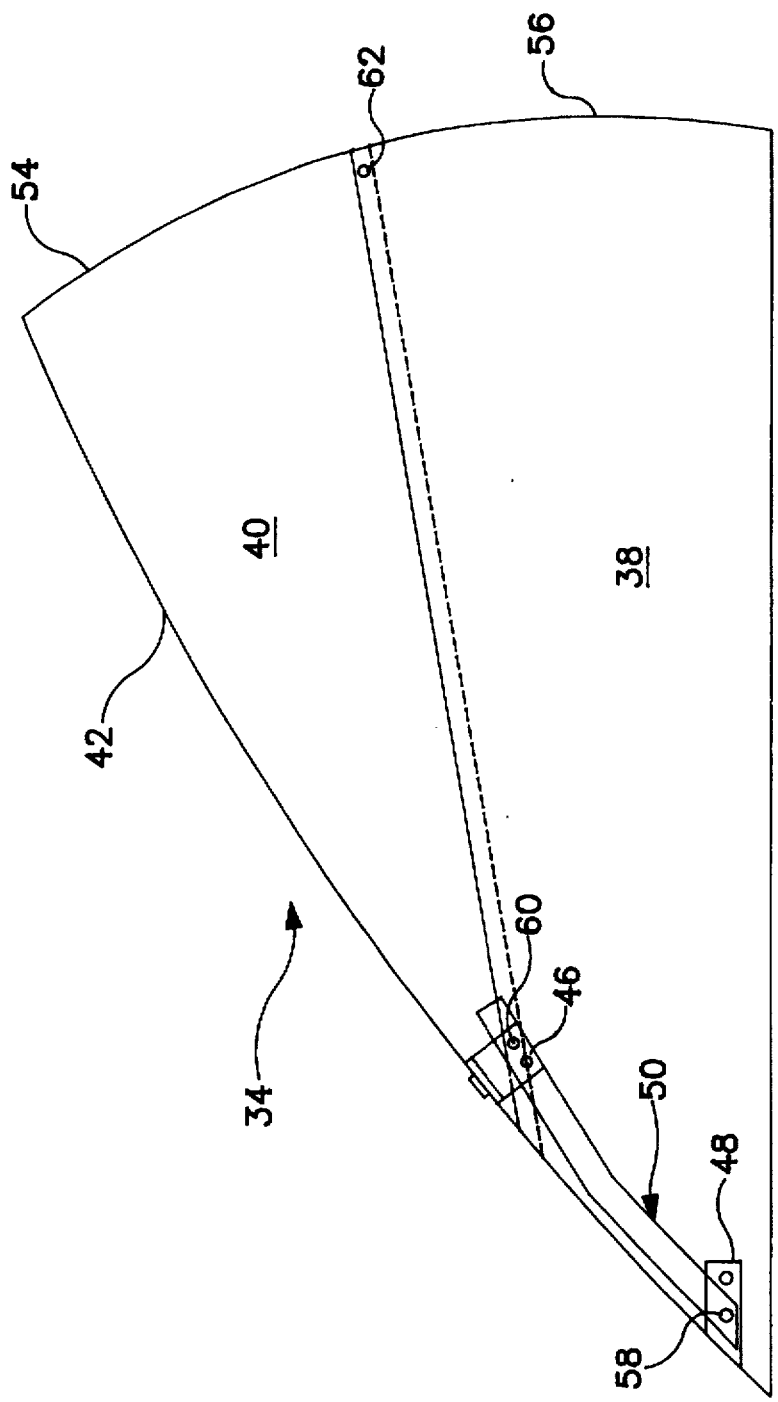
FIG. 7 illustrates the roof fairing shown in FIG. 6 in its extended operating position.

FIG. 7 illustrates the fairing 34 of FIG. 6 in its extended operating position. The same references numerals are used to designate elements in FIG. 7 which correspond to the same elements designated in FIG. 6. When the upper fairing segment 40 is extended above the lower fairing segment 38, the fairing 34 is removably locked into its extended position by a first bolt 58 removably inserted into a suitable opening defined in the hinge element 48 mounted to the lower fairing segment 38, a second bolt 60 removably inserted into an opening defined in the hinge element 46 mounted to the upper fairing segment 40. By removably locking hinge elements 46 and 48, the arm 50 connecting the front portions of the upper and lower fairing sections 38 and 40 is removably locked into a fixed position which prevents the arm 50 from pivoting, thereby preventing relative movement between the upper and lower fairing segments 40 and 38. Reference numeral 62 designates a bolt received through suitable openings in the rear portions of the upper and lower fairing segments to removably lock the rear portion of the fairing 34 into its extended operating position as shown by FIG. 7.

Figure 8:
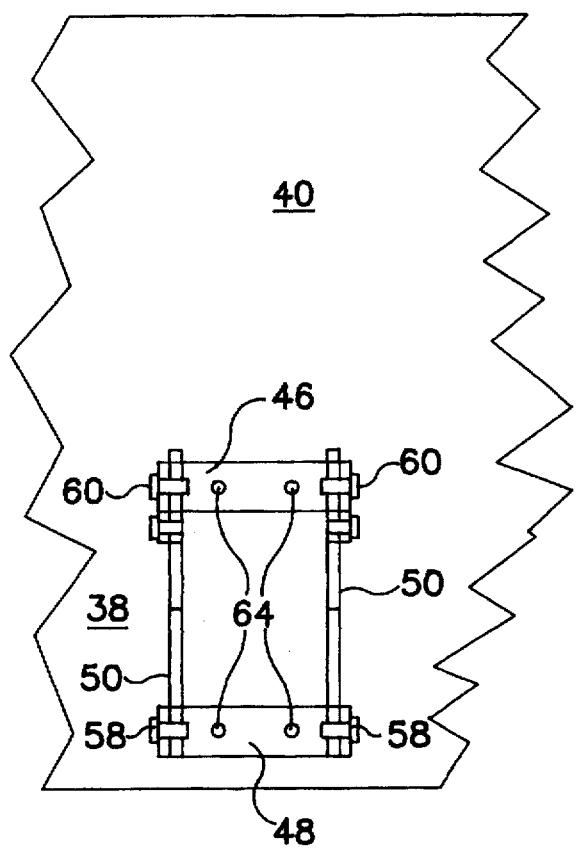
FIG. 8 illustrates a top plan view of the roof fairing of FIG. 7 illustrating the hinge system thereof in greater detail.

FIG. 8 of the drawing illustrates a top plane view, partially in section, of the fairing 34 illustrated by FIG. 7. The same reference numerals in FIG. 8 are used to designate corresponding elements illustrated in FIGS. 6 and 7. The hinge element 48 is mounted to the lower fairing segment 38 by bolts received through two spaced openings 64, while hinge element 46 is mounted to upper fairing segment 40 by two bolts received through two similar openings 64. FIG. 8 further illustrates that the arm 50 connecting the hinge elements 46 and 48 comprises two separate parallel arms, one of which connects the right end of hinge elements 46 and 48, and the other of which connects the left end of hinge elements 46 and 48. Each lateral end of hinge element 48 receives a bolt 58 passing through the arm 50 adjacent to the respective side end of the hinge element 48, while each lateral end of hinge element 46 receives a bolt 60 passing through the arm 50 adjacent to the respective side of the hinge element 46. As previously discussed herein, the bolts 58 and 60, which are removably received within the hinge elements 46 and 48, prevent the parallel arms 50 from pivoting, thereby releasably locking the top fairing segment fairing 40 in its extended operating position relative to the lower fairing segment 38, as illustrated by FIG. 7.

When the fairing 34 illustrated by FIG. 7, which is shown in its extended operating position, is to be moved into its retracted storage position, bolts 58, 60 and 62 are removed. The removal of bolts 58 and 60 permits the arm 50 connecting the upper and lower fairing segments to be pivoted rearwardly and downwardly as viewed in FIG. 7 to permit the upper fairing segment to be received within the hollow lower fairing segment such that the top surface of 42 of the upper fairing segment does not extend above the top surface 44 of the lower fairing segment, as illustrated by FIG. 6. As is known to the art, and as exemplified by the aforementioned prior art patents identified herein, fairing 34 is configured to taper outwardly in a direction from front to rear (from left to right as illustrated in FIGS. 6 and 7) such that the rear ends 54 and 56 of the upper and lower fairing segments are wider than the front ends of the fairing 34. In this manner, the narrower front end portion of the upper fairing segment 40 is readily received within the wider intermediate portion of lower fairing segment 38 when the upper fairing segment is received within the lower fairing segment by pivoting the arm 50 rearwardly (to the right) as illustrated by FIGS. 6 and 7.

Figure 9A:
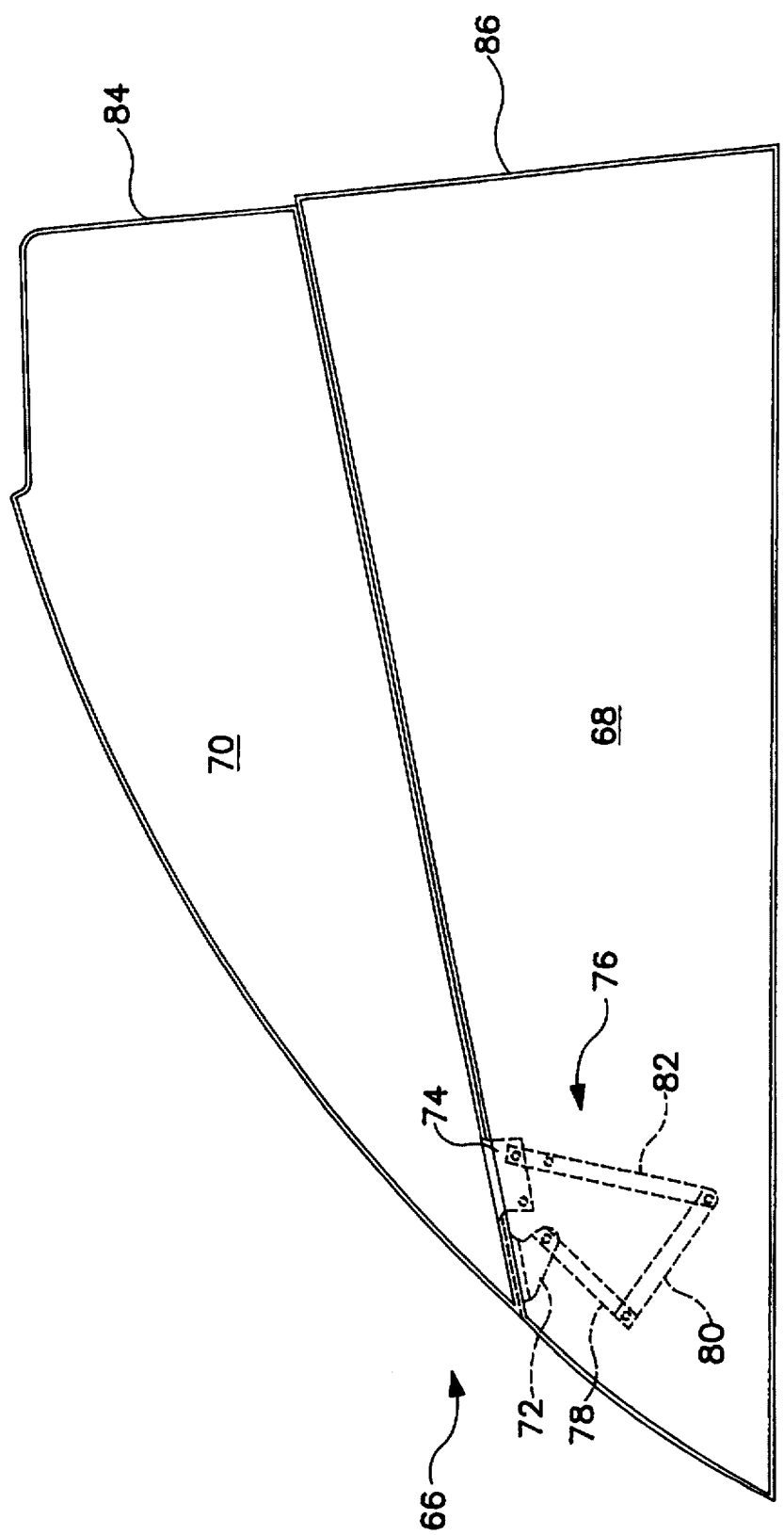
FIGS. 9A & 9B illustrate a roof fairing in accordance with the present invention shown, respectively, in its extended operating position and in its folded storage position in which the top portion is completely received within the lower portion.
Figure 9B:
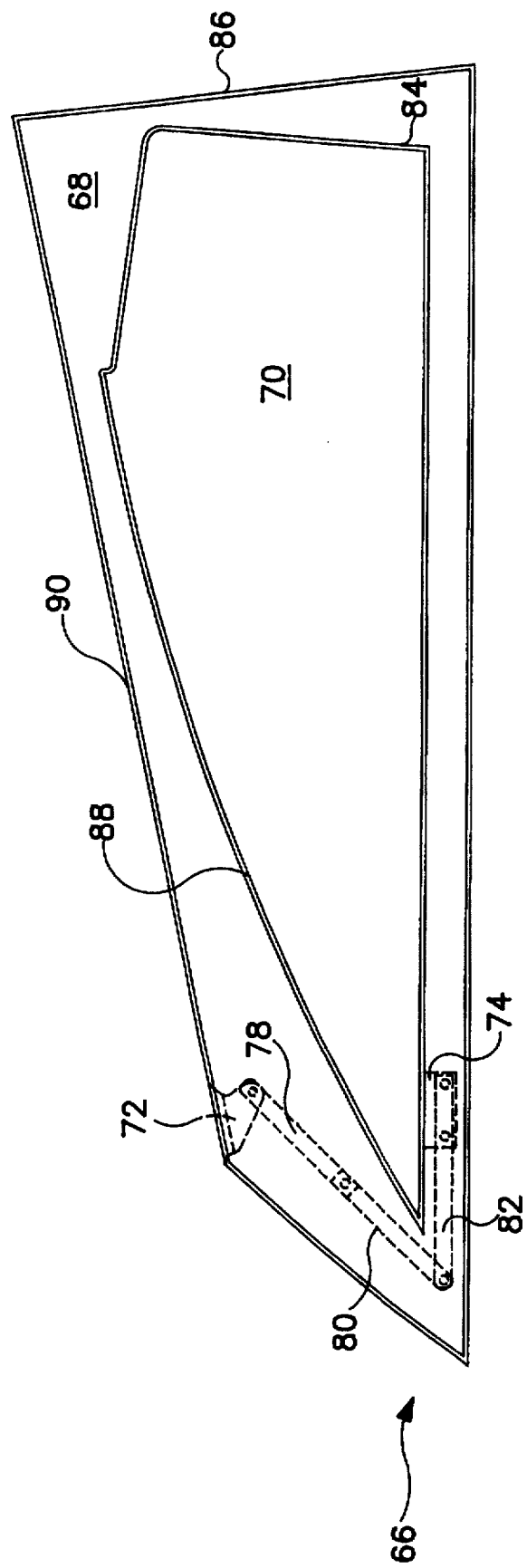

FIGS. 9A and 9B illustrate a further embodiment of a collapsible roof fairing in accordance with the present invention. Reference numeral 66 generally designates the roof fairing, which is shown in its extended operating position in FIG. 9A and is shown in its retracted folded position by FIG. 9B. The roof fairing 66 includes a lower fairing segment 68 and an upper fairing segment 70. Hinge element or anchor 72 is fixedly mounted proximate to the upper forward end of lower fairing segment 68, and hinge element or anchor 74 is fixedly mounted proximate to the lower forward end of upper fairing segment 70. The hinge elements or anchors 72 and 74 are coupled together by a connecting arm generally designated by reference numeral 76, comprising a plurality of adjacent arm segments having their end portions pivotably mounted to each other. As illustrated by FIGS. 9A and 9B, connecting arm 76 comprises a first segment 78 having one end thereof pivotably mounted to the anchor or hinge element 72 fixedly mounted to the lower fairing segment 68, and the opposed end thereof pivotably mounted to one end of an adjacent intermediate arm segment 80. The opposed end of arm segment 80 is pivotably mounted to one end of adjacent arm segment 82, and the opposed end of arm segment 82 is pivotably mounted to the hinge or anchor element 74 which itself is fixedly mounted to the upper fairing segment 70. Accordingly, the segments 78, 80 and 82 of the connecting arm 76 are pivotable relative to each other, and pivotable relative, to the hinge or anchor elements 72 and 74 fixedly mounted to the lower and upper fairing segments 68 and 70, respectively.

To move the fairing 66 from its extended position as shown by FIG. 9A to its retracted position as shown in FIG. 9B, the top fairing segment 70 is first moved rearwardly (to the right in FIG. 9A) relative to the lower fairing segment 68. As the upper segment 70 moves rearwardly relative to the fixed forward segment 68, the front narrower portion of fairing segment 70 is positioned above the wider intermediate and rear portion of the hollow lower fairing segment 68 (As indicated above, the fairing 66 tapers outwardly in a direction from front to rear so that the intermediate and rear portions of lower fairing segment 68 are wider than the forward portion of the upper fairing segment 70). Accordingly, as the upper fairing segment 70 is moved rearwardly relative to the fixed lower fairing segment 68, the upper fairing segment may also be moved downwardly and received within the hollow lower fairing segment 68. As a result of the multiple segments of arm 76, once the upper fairing segment 70 is lowered into the lower fairing segment 68, the upper fairing segment 70 can be advanced forwardly towards the front of the lower fairing segment (towards the left in FIGS. 9A and 9B) such that the rear end 84 of the upper fairing segment does not extend rearwardly beyond the rear end 86 of lower fairing segment 68, as illustrated by FIG. 9B. Moreover, when upper fairing segment 70 is received completely retracted within lower fairing segment 68 as illustrated by FIG. 9B, no portion of the top surface 88 of the upper fairing segment extends above any portion of the upper surface 90 of the lower fairing segment.

As a result of the multiple linkage employed by fairing 66, the embodiment of the invention illustrated by FIGS. 9A and 9B provides a collapsible roof fairing by which the upper fairing segment is entirely enclosed within the lower fairing segment in the maximum retracted position thereof, as illustrated by FIG. 9B. As discussed with respect to the embodiment of the invention illustrated by FIGS. 6–8, means are provided for releasably securing fairing 66 in its extended operating position (FIGS. 9A) and its retracted position (FIG. 9B). The means for releasably securing the fairing in its respective positions includes bolts removably received within suitable openings in the hinge or anchor element 72 and 74, and in the rear portions of lower and upper fairing segments 68 and 70.

Figure 10A:
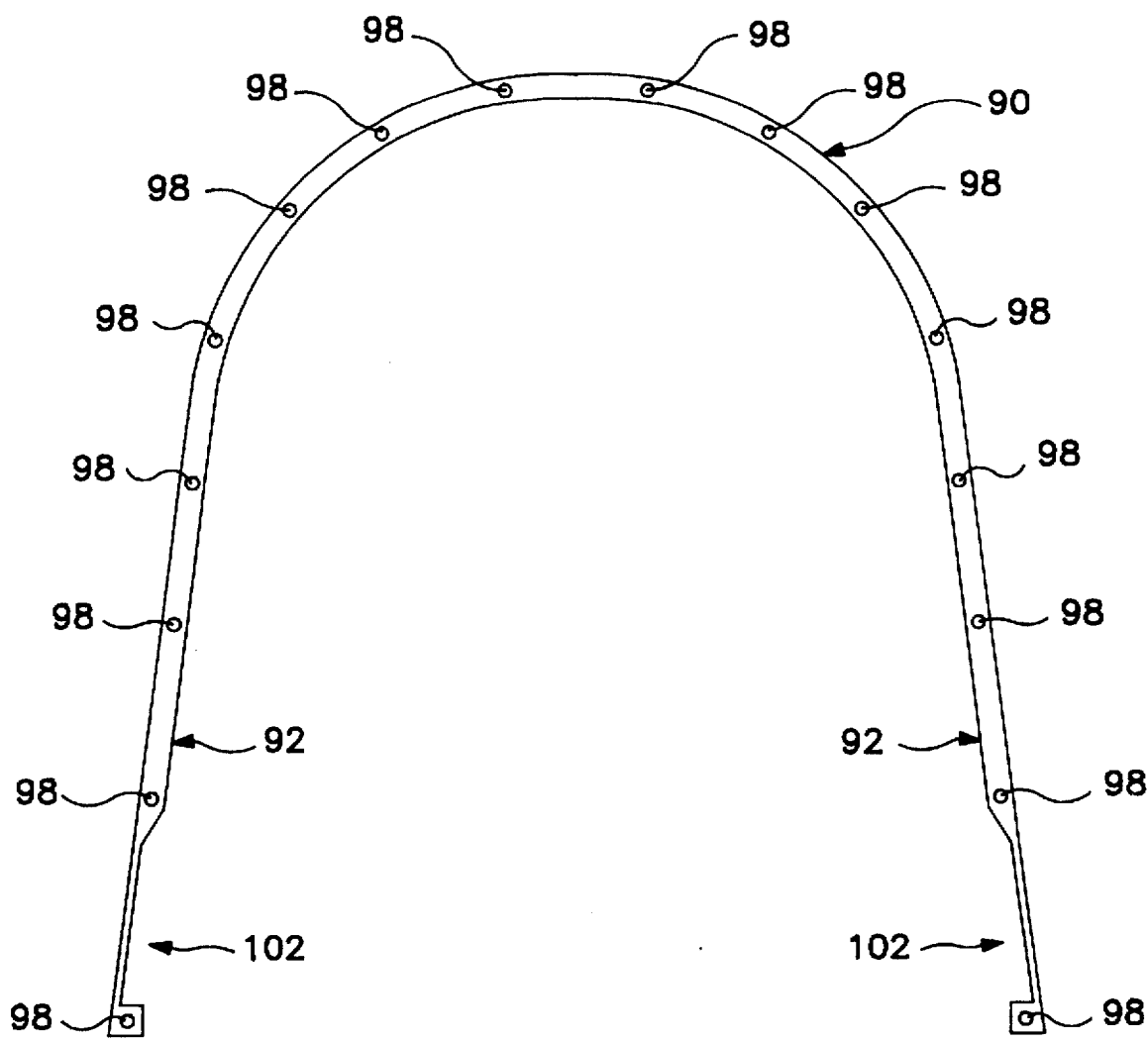
FIGURES 10A & 10B illustrate flanges for the mating of the upper and lower portions of a roof fairing in accordance with the present invention for removably mounting the top section to the lower section when the fairing is in its extended operating position.
Figure 10B:
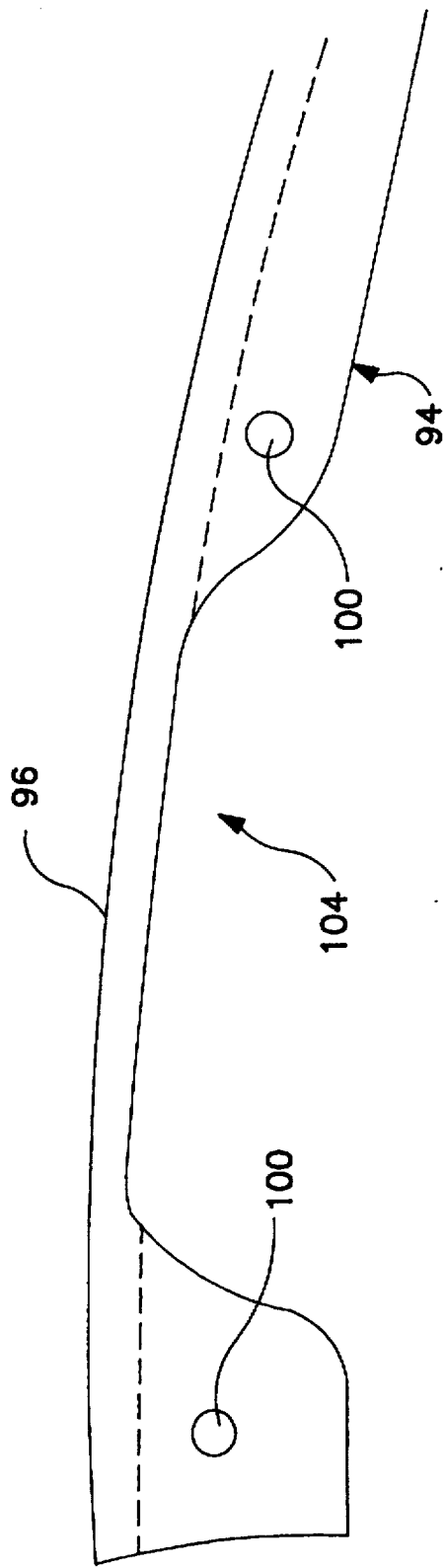

Referring now to FIGS. 10A and 10B, these drawings illustrate, respectively, a flange 92 extending inwardly from the top edge 90 of the lower fairing segment 68 (as illustrated in FIGS. 9A and 9B), and a portion of a complementary flange 94 extending inwardly from a lower edge 96 of an upper fairing segment, as for example, upper fairing 70 illustrated in FIGS. 9A and 9B. The upper and lower flanges 92 and 94 are oriented substantially perpendicular to the respective edges 90 and 96 of lower and upper fairing segments such as segments 68 and 70 shown in FIGS. 9A and 9B. Inwardly directed flange 92 defines a plurality of openings 98 therein, and inwardly directed flange 94 defines a plurality of openings 100 therein. The corresponding openings 98 and 100 are oriented relative to each other to be in alignment when the upper fairing segment 70 is in its extended operating position atop the lower fairing segment 68, as illustrated in FIG. 9A. Bolts or other retaining elements are inserted into the corresponding aligned openings 98 and 100 to removably secure the top fairing segment 70 in its extended operating position above the lower fairing segment 68.

A cutout section 102 is defined in the flange 92 extending inwardly from the top edge 90 of the lower fairing segment, and a corresponding cutout 104 is defined on the flange 94 extending inwardly from the lower edge 96 of the upper fairing segment. As a result of the cutout portions of the flanges, and particularly the cutout 102 defined on the lower fairing segment, additional clearance is provided for moving the upper fairing segment into and out of the lower fairing segment when the fairing is moved between its extended operating position and retracted storage position. As illustrated by FIG. 10A, the bottom fairing section (and also the upper fairing section) is narrowest at the front end thereof and tapers outwardly in a rearwardly direction such that the widest portion of the fairing is at its rear. The cutout 102 is provided in the lower fairing segment proximate to the rear end thereof to provide further clearance for receiving the narrower front end of the upper fairing segment, when the upper segment is moved into and out of the lower fairing segment.

A collapsible roof fairing in accordance with the present invention exhibits numerous advantages over the known devices. By providing a fixed lower fairing segment capable of receiving an upper fairing segment entirely therein, a truck having the fairing installed thereon is provided with further clearance for passing under bridges and other overhead structure as a result of the reduced overall height of the truck and fairing. Morever, by receiving the upper fairing section entirely within the lower fairing section, the upper fairing section is more fully protected from damage when the truck is transported with the fairing in its retracted position. A collapsible fairing in accordance with the present invention also exhibits improved structural stability when mounted atop a truck in its extended operating position since the fixed bottom fairing segment is greater in height than the movable top fairing segment. Moreover, as a result of the increased clearance of the truck under bridges and other overhead structures as a result of the fairing in accordance with the present invention, the height of the cab or sleeper compartment of the truck may be correspondingly increased, thereby increasing the compartment space in the truck to enhance the comfort and convenience of the driver.

Figure 11:
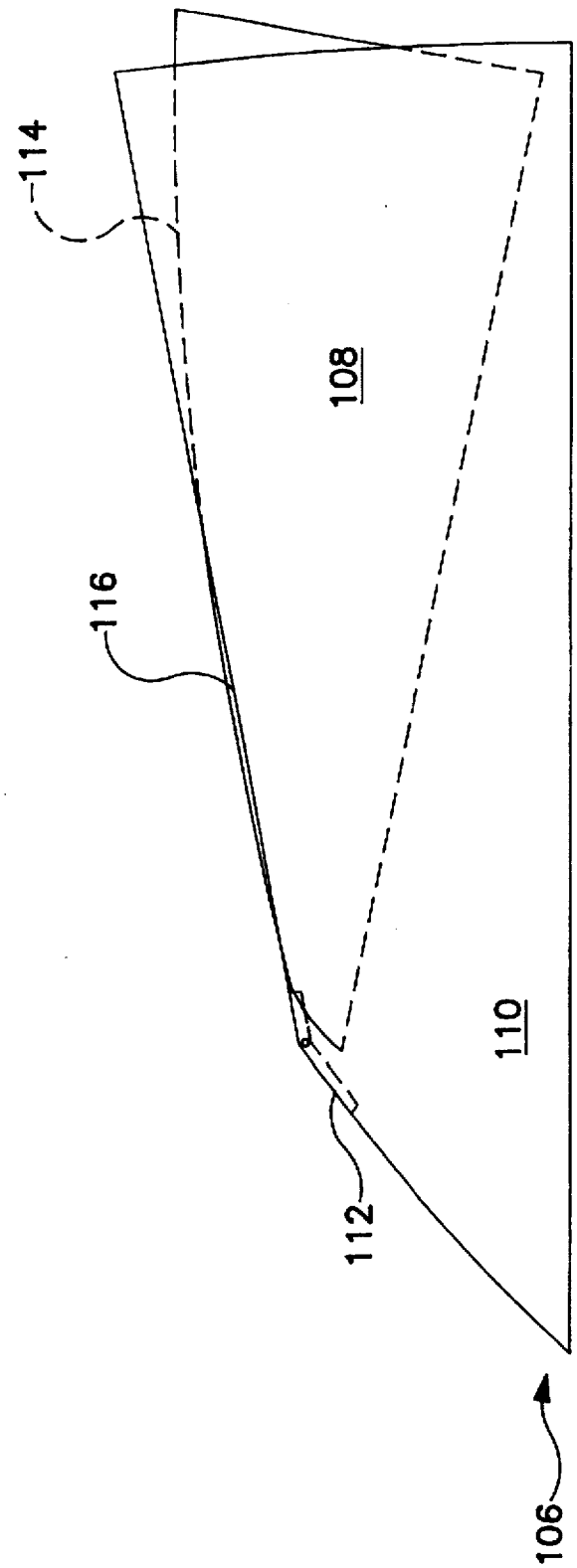
FIG. 11 illustrates a modification of the embodiment shown in FIG. 6 in which the upper fairing section is partially, but not completely, received within the lower fairing section in the retracted position of a roof fairing in accordance with the present invention.

In the preferred embodiments of the present invention, as exemplified by FIG. 6 of the drawing previously discussed herein, the upper fairing section is completely received within the lower fairing section in the retracted position of the roof fairing such that no part of the top surface of the upper fairing section extends above any part of the top surface of the lower fairing section when the upper section is received within the lower section. However, FIG. 11 of the drawing illustrates a further modification of a roof fairing also within the scope of the present invention. FIG. 11 shows a roof fairing generally designated by reference numeral 106 in which an upper fairing section 108 is partially, but not completely, received within a lower fairing section 110 in the retracted fairing position illustrated by the drawing. The upper and lower fairing sections are pivotably mounted to each other by hinge 112. At least a portion of the top surface 114 of the upper fairing section 108 does not extend above the top surface 116 of the lower fairing section 110 when the fairing is in the retracted position as shown by FIG. 11. Preferably, the majority portion of the top surface 114 of the upper fairing section 108 will not extend above the top surface 116 of the lower fairing section 110 in the retracted fairing position. It is also preferable that at least 90% of the volume of the upper fairing section 108 be received within the hollow lower fairing section 110 in the retracted fairing position. It is further preferable that the upper and lower fairing sections 108 and 110 be configured, designed and arranged to cooperate with each other such that the maximum height of the uppermost portion of the fairing 106 in the retracted fairing position illustrated by FIG. 11, does not exceed a height of 13 ft. 6 in. when the retracted roof fairing 106 is mounted atop a truck in its towed position, as exemplified generally by trucks 4 and 6 illustrated in FIG. 3.

Other features, modifications, and advantages of the roof fairing disclosed herein and within the scope of the present invention will become apparent to those skilled in the relevant art. Accordingly, the above discussion of the preferred embodiments of the invention is intended to be illustrative only, amd not restrictive of the scope of the invention, that scope being defined by the following claims and all equivalents to.

We claim:

1. A roof fairing for reducing drag on a motor vehicle, said fairing comprising:

an upper fairing segment and a lower fairing segment, said lower fairing segment adapted to be mounted to the roof of a vehicle, said upper fairing segment being movably mounted relative to said lower fairing segment for movement between an extended operating position of said upper fairing segment relative to said lower fairing segment and a retracted position in which said upper fairing segment is received within said lower fairing segment;

said upper fairing segment defining a top surface, and said lower fairing segment defining a top surface; and means for movably mounting said upper fairing segment relative to said lower fairing segment such that said upper fairing segment is receivable within said lower fairing segment such that at least a portion of the top surface of said upper fairing segment does not extend above the top surface of said lower fairing segment.

2. The roof fairing as claimed in claim 1 wherein:

said upper fairing segment defines a rear end portion, said lower fairing segment defines a rear end portion, and said means for movably mounting said upper fairing segment relative to said lower fairing segment is arranged to prevent said rear end of said upper fairing segment from extending rearwardly of said rear end of said lower fairing segment when said upper fairing segment is received in said retracted position within said lower fairing segment, such that said upper fairing segment is enclosed within said lower fairing segment.

3. The roof fairing as claimed in claim 1 wherein said means for movably mounting said upper fairing segment relative to said lower fairing segment includes:

a first anchor element fixedly mounted to said upper fairing segment;

a second anchor element fixedly mounted to said lower fairing segment, and a connecting arm coupled to said first and second anchor elements, one end of said connecting arm being pivotably mounted relative to said first anchor element, the other end of said connecting arm being pivotably mounted relative to said second anchor element, wherein said connecting arm is pivotable in response to movement of said upper fairing section relative to said lower fairing section.

4. The roof fairing as claimed in claim 1 wherein said means for movably mounting said upper fairing section relative to said lower fairing section includes:

a first anchor element fixedly mounted relative to said upper fairing segment, a second anchor element fixedly mounted relative to said lower fairing segment, and means for connecting said first and second anchor elements, said means for connecting including at least a first connecting arm having one end thereof pivotably mounted to said first anchor element, a second connecting arm having one end thereof pivotably mounted to said second anchor element, and means for pivotably coupling the opposed ends of said first and second connecting arms to each other.

5. The roof fairing as claimed in claim 4 further including at least one intermediate connecting arm disposed between said opposed ends of said first and second connecting arms, one end of said intermediate arm being pivotably connected to said opposed end of said first connecting arm, the other end of said intermediate arm being pivotably connected to said opposed end of said second connecting arm.

6. The roof fairing as claimed in claim 5 further including a plurality of intermediate connecting arms disposed between said first and second connecting arms, each of said intermediate connecting arms having at least one end thereof pivotably connected to an adjacent end of another of said plurality of said intermediate connecting arms.

7. The roof fairing as claimed in claim 3 further including:

at least two anchor elements fixedly mounted to said upper fairing segment, at least two anchor elements fixedly mounted to said lower fairing segment, and at least two connecting arms pivotably mounted at each end thereof to one of said anchor elements on said upper fairing segment and another of said anchor elements on said lower fairing segments, said anchor elements and said connecting arms being arranged such that said two connecting arms extend in a direction substantially parallel to each other.

8. The roof fairing as claimed in claim 4 further including:

at least two anchor elements fixedly mounted on said lower fairing segment, at least two anchor elements fixedly mounted on said upper fairing segment, and at least two connecting arms each comprising two pivotable arm sections; one of said two connecting arms connecting one of said anchor elements on said lower fairing segment with one of said anchor elements on said upper fairing segment; the other of said connecting arms connecting the other of said anchor elements on said lower fairing segment with the other of said anchor elements on said upper fairing segment;

said anchor elements on said upper and lower fairing segments being arranged such that said two connecting arms are oriented in a direction substantially parallel to each other.

9. The roof fairing as claimed in claim 3 further including means for releasably locking said upper fairing in its extended operating position and its retracted position, said means for releasably locking including means operatively associated with said connecting arm for preventing pivotable movement thereof relative to said upper and lower fairing segments for preventing said upper fairing segment from moving relative to said lower fairing segment.

10. The roof fairing as claimed in claim 4 further including means for releasably locking said upper fairing in its extended operating position and its retracted position, said means for releasably locking including means operatively associated with said connecting arm for preventing pivotable movement thereof relative to said upper and lower fairing segments for preventing said upper fairing segment from moving relative to said lower fairing segment.

11. The roof fairing as claimed in claim 9 wherein said first and second anchor elements and said connecting arm are provided proximate to the front end of said fairing, and further means for releasably locking said upper fairing segment relative to said lower fairing segment in said extended operating and retracted positions is provided proximate to the rear end of said fairing.

12. The roof fairing as claimed in claim 10 wherein said first and second anchor elements and said connecting arm are provided proximate to the front end of said fairing, and further means for releasably locking said upper fairing segment relative to said lower fairing segment in said extended operating and retracted positions is provided proximate to the rear end of said fairing.

13. A roof fairing for reducing drag on a motor vehicle, said roof fairing comprising a lower fairing segment adapted to be mounted to the roof of a vehicle, and an upper fairing segment movably mounted relative to said lower fairing segment;

means for moving said upper fairing segment relative to said lower fairing segment between an extended operating position of said fairing and a retracted position of said fairing in which said upper fairing segment is received within said lower fairing segment;

a first flange extending from a bottom edge of said upper fairing segment, and a second flange extending from a top edge of said lower fairing segment, said first and second flanges adapted to engage each other for removably coupling said upper fairing segment to said lower fairing segment when said upper fairing segment is in its extended operating position relative to said lower fairing segment;

said flange extending from said top edge of said lower fairing segment defining a cutout portion for providing clearance for said upper fairing segment as it is moved into and out of said lower fairing segment when said fairing is moved between said extended and retracted positions.

14. The fairing as claimed in claim 13 wherein said flange extending from the bottom edge of said upper fairing segment defines a cutout portion thereon substantially corresponding to said cutout portion on said flange extending from said top edge of said lower fairing segment.

15. The roof fairing as claimed in claim 13 wherein said upper and lower fairing segments are each configured to taper outwardly in a direction from the front to the rear of the fairing such that the rear portions of said upper and lower fairing segments are wider than the forward portions of said upper and lower fairing segments, said cutout portion in said flange extending from said lower fairing segment being defined proximate to the rear of said lower fairing segment such that it is closer to the rear end of said lower fairing segment than to the forward end of said lower fairing segment.

16. A roof fairing for reducing the drag on a motor vehicle, said roof fairing comprising:

a lower fairing segment adapted to be fixedly mounted to the roof of a vehicle, an upper fairing segment movably mounted relative to said lower fairing segment, and means for moving said upper fairing segment relative to said lower fairing segment between an extended operating position in which said upper fairing segment is atop said lower fairing segment, and a retracted position in which said upper fairing segment is received within said lower fairing segment;

said means for movably mounting said upper fairing segment relative to said lower fairing segment includes at least a first anchor element fixedly mounted relative to said upper fairing segment, a second anchor element fixedly mounted relative to said lower fairing segment, and a connecting arm having a first end pivotably mounted to said first anchor element and a second end pivotably mounted relative to said second anchor element, wherein said connecting arm is movable in response to movement of said upper fairing segment relative to said lower fairing segment;

said first and second anchor elements and said connecting arm being arranged such that when said upper fairing segment is received within said lower fairing segment in said retracted position of said fairing, the majority portion of the top surface of said upper fairing segment does not extend above the top surface of said lower fairing segment.

17. The roof fairing as claimed in claim 16 wherein said first and second anchor elements and said connecting arm are relatively arranged such that the rear end of said upper fairing segment does not extend rearwardly beyond the rear end of said lower fairing segment when said upper fairing segment is received in said retracted position in said lower fairing segment.

18. The roof fairing as claimed in claim 17 wherein said connecting arm comprises at least two segments having adjacent ends pivotably coupled to each other.

19. The roof fairing as claimed in claim 16 further including means for releasably locking said upper fairing segment in said extended and said retracted positions relative to said lower fairing segment, said means for releasably locking including means operatively associated with said connecting arm for preventing movement of said connecting arm relative to said upper and lower fairing segments.

20. The roof fairing as claimed in claim 16 further including a flange element extending from a top edge of said lower fairing segment, said flange element defining a cutout portion thereon for providing clearance for movement of said upper fairing section relative to said lower fairing section when said fairing is moved between said extended and retracted positions.

21. The roof fairing as claimed in claim 1 wherein when said upper fairing segment is received within said lower fairing segment, the majority portion of the top surface of said upper fairing segment does not extend above the top surface of said lower fairing segment.

22. The roof fairing as claimed in claim 21 wherein when said upper fairing segment is received within said lower fairing segment, substantially no portion of the top surface of said upper fairing segment extends above the top surface of said lower fairing segment.

* * * * *